Feb. 19, 1924.

A. J. BARNHART

TRACTOR CULTIVATOR

Filed Sept. 22, 1921

INVENTOR.
ANDREW J. BARNHART.
BY Herman Miller

ATTORNEY.

Feb. 19, 1924.
A. J. BARNHART
1,484,318
TRACTOR CULTIVATOR
Filed Sept. 22, 1921     2 Sheets-Sheet 2
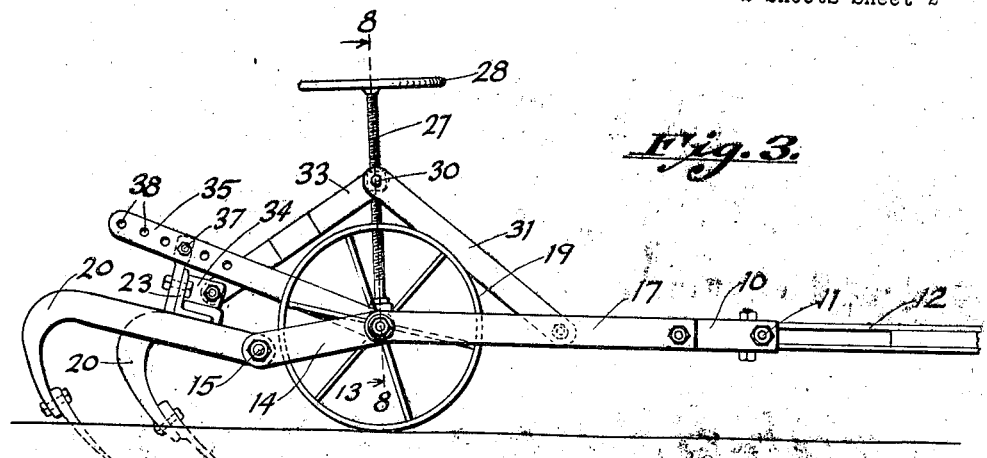
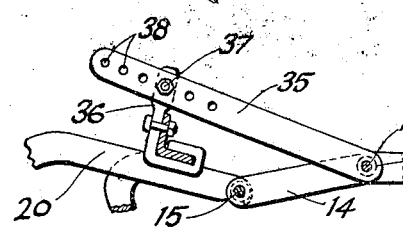
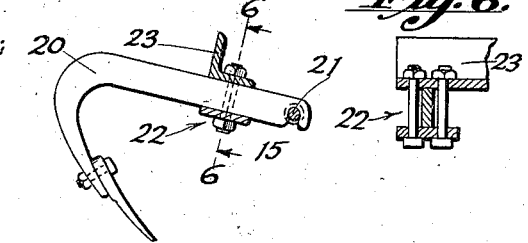
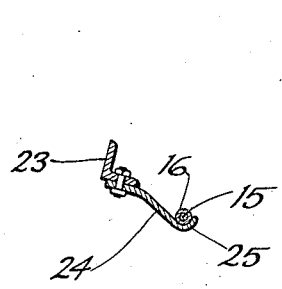
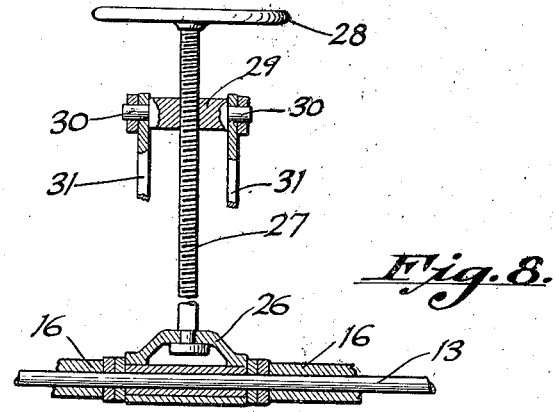
INVENTOR.
Andrew J. Barnhart
BY Herman Miller
ATTORNEY.

Patented Feb. 19, 1924.

1,484,318

UNITED STATES PATENT OFFICE.

ANDREW J. BARNHART, OF PLACENTIA, CALIFORNIA.

TRACTOR CULTIVATOR.

Application filed September 22, 1921. Serial No. 502,468.

*To all whom it may concern:*

Be it known that I, ANDREW J. BARNHART, a citizen of the United States, residing at Placentia, in the county of Orange and State of California, have invented new and useful Improvements in Tractor Cultivators, of which the following is a specification.

My invention relates to a traction cultivator, the principal objects of my invention being to generally improve upon and simplify the construction of the existing types of tractor drawn cultivators, to provide a construction that is relatively simple and practical, capable of being easily and cheaply produced and further, to provide simple and efficient means for controlling the action of the cultivator plows or shovels and regulating the depth of their passage through the ground while the cultivator is in operation.

With the foregoing and other objects in view, my invention consists in certain novel features of construction and arrangement of parts that will be hereinafter more fully described and claimed and illustrated in the accompanying drawings in which:

Fig. 3 is a side elevational view of the cultivator with the plows or shovels positioned within the ground.

Fig. 4 is a cross section taken approximately on the line 4—4 of Fig. 1.

Fig. 5 is a cross section taken on the line 5—5 of Fig. 1.

Fig. 6 is a cross section taken on line 6—6 of Fig. 5.

Fig. 7 is a cross section taken on the line 7—7 of Fig. 1.

Fig. 8 is an enlarged vertical section taken on line 8—8 of Fig. 3.

Figures 1, 2:
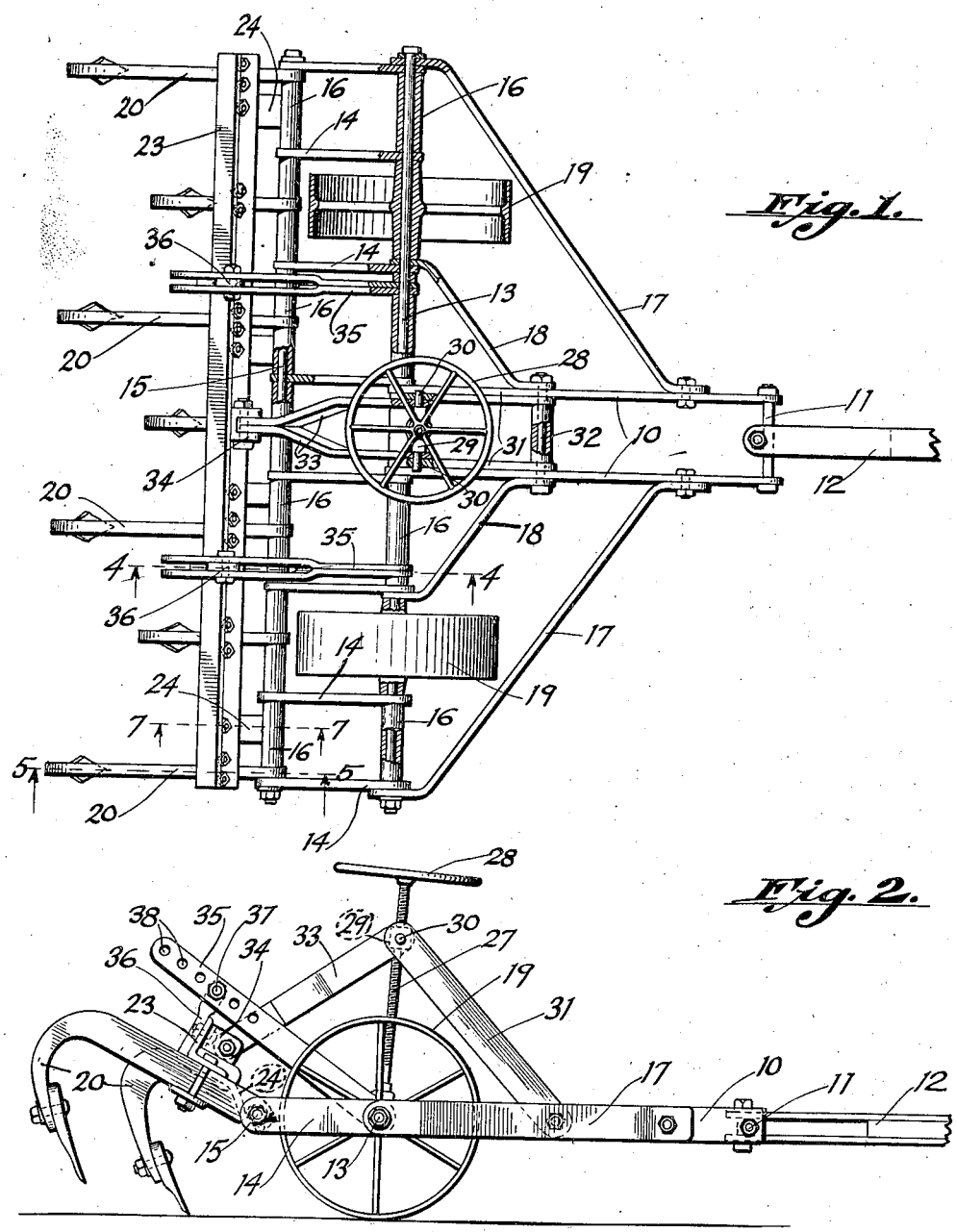
Fig. 1 is a top plan view of a tractor drawn cultivator of my improved construction with parts shown in horizontal section.
Fig. 2 is a side elevational view of my cultivator with the plows or shovels withdrawn from the ground.

The frame of my improved cultivator comprises a pair of parallel bars 10, the forward ends of which are connected by a cross bolt 11 and to which latter the draw bar 12 of a tractor is adapted to be connected when the cultivator is in use. Extending through the rear ends of the bars 10 is a transversely disposed rod 13 the end portions of which extend substantial distances away from said bars 10 and connected to said rod 13 by short rearwardly projecting links 14 is a second transversely disposed rod 15. The rods 13 and 15 lie parallel with each other and located on said rods between the short links 14 are tubular spacing members 16.

Connecting the ends of the rod 13 with the forward portions of bars 10 are diagonally disposed braces 17 and shorter braces 18 are arranged between the intermediate portions of the bars 10 and the rod 13 at points between the center and the ends thereof.

Wheels 19 are mounted on rod 13 between the outer ends of the braces 18 and 17, said wheels serving as a rolling support for the cultivator. A series of cultivator shovels or plow carrying beams 20 are provided at their forward ends with hooks 21 which engage over rod 15 and the forward portions of all of the beams 20 are connected by suitable clamps 22 to a transversely disposed beam 23 preferably of angle iron.

Secured to the underside of beam 23 are the rear ends of a series of forwardly projecting brackets 24, the forward ends of the latter being provided with hooks 25 that engage beneath the rod 15 and the spacing members 16 positioned thereupon. Loosely arranged upon the central portion of rod 13, is a block 26 to which is swiveled the lower end of a vertically disposed threaded shaft 27, provided at its upper end with a hand wheel 28 and screw seated upon said shaft is a block 29.

Projecting outwardly from the ends of blocks 29 are pins 30 upon which are pivotally arranged the upper ends of a pair of inclined links 31, the lower ends of which are pivotally connected to a transversely disposed rod 32 that is seated in bars 10 a short distance in front of rod 13. The upper ends of a pair of inclined links 33 are pivotally connected to pins 30 and the rear lower ends of said links are pivotally connected to a bracket 34 that is secured to the center of the beam 23.

Pivotally connected to rod 13 adjacent to the rear ends of braces 18 are the forward ends of rearwardly and upwardly projecting links 35 the same being arranged in pairs with the rear portions of the members of each pair spaced apart and secured in any suitable manner to beam 23 are upwardly projecting brackets 36, the upper ends of which pass between the spaced rear portions of the pairs of links 35. The upper ends of the brackets 36 are perforated and receive bolts 37 and which latter are adapted to pass through apertures 38 that are formed in the rear portions of links 35, there being a plurality of these apertures 38 in order to effect adjustment between said links and brackets.

The cultivator is drawn over the ground by connecting the forward end of the frame of said cultivator to the draw bar 12 of a tractor or like machine and as the cultivator is thus drawn forward, the plows will enter the ground and move forwardly therethrough to effect the plowing or cultivating operations. The depth at which the points or lower ends of the cultivator plows or shovels is regulated is by means of the screw shaft 27 which, when rotated, will move block 29 upwardly and downwardly, consequently raising and lowering the beam 23 to which the cultivator or shovel carrying beams are connected.

Where shallow plowing or cultivating is desired, the brackets 36 are connected by means of the bolts 37 to the rear portions of links 35 or if it is desired to plow or cultivate the ground to a considerable depth, said brackets are connected to the links 35 adjacent to their intermediate portions, such adjustment being permitted by numbers of apertures 38 in said links 35.

The adjustment between the brackets 36 and links 35 is, of course, effected before the plows enter the ground and when screw rod 27 is manipulated to lower the block 29, the plow carrying beams will be lowered so that during operation, the lower ends or points of the cultivator plows or shovels will travel in the same horizontal plane below the surface of the ground and when so positioned, said plows or shovels operate to the best advantage.

Thus the adjustment between the brackets 36 and links 35 regulates the depth of operation of the plows in the ground and the screw shaft 27 provides means for simultaneously raising all of the plows when the machine is being turned at the end of a field or while it is being drawn to or from the point of use.

Thus it will be seen that I have provided a tractor cultivator that is relatively simple in structure, capable of being easily and cheaply produced and which may be readily adjusted so as to regulate the depth to which the plows or shovels enter and move through the ground.

Various changes may be made in the details of construction by those skilled in the art without departing from the spirit of my invention as set forth in the appended claims.

I claim as my invention:

1. In a tractor cultivator, a wheel supported frame and its axle rod, a series of plow carrying beams pivotally connected to the rear portion of said frame, a pair of links pivotally connected to the plow carrying beams, a pair of links pivotally connected to the frame of the cultivator, a block to which the inner ends of the pairs of links converge and are connected, a threaded shaft passing through said block and swiveled on said rod.

2. In a tractor cultivator, a wheel supported frame including a transversely disposed axle rod, a cultivator plow carrying frame including a transversely disposed rod and a transverse beam, links connecting the transversely disposed rods of said wheel supported frame and the plow carrying frame, adjustable radius rod connections between the rod of the wheel supported frame and the plow carrying frame, and means located on the wheel supported frame and connected to the plow carrying frame beam for elevating the frame, said means including a screw threaded shaft swivelled in upright position on the axle rod and having a nut lock to which are connected the convergent ends of pairs of downwardly divergent links, said links being connected at their outer ends respectively to the vehicle frame and to the said transverse beam.

3. In a tractor cultivator, the combination with a wheel supported frame, of a plow carrying frame having a cross beam, links connecting the plow carrying frame to the wheel supported frame, a screw shaft located on the wheel supported frame and connected by links to the plow carrying frame beam and to the wheel frame for raising or lowering the former, and adjusting links connected to the wheel supported frame and to said plow carrying frame beam for controlling the depth to which the plows enter the ground.

In testimony whereof I have signed my name to this specification.

ANDREW J. BARNHART.